United States Patent

Trzeciak

[11] Patent Number: 5,928,296
[45] Date of Patent: Jul. 27, 1999

[54] METHOD OF CONTROLLING ENGINE STARTING OF VEHICLE HAVING POWERTRAIN CONTROL MODULE

[75] Inventor: Robert Timothy Trzeciak, Southgate, Mich.

[73] Assignee: Ford Global Technologies, Inc., Dearborn, Mich.

[21] Appl. No.: 08/717,573
[22] Filed: Sep. 23, 1996
[51] Int. Cl.⁶ ................................................ B60R 25/04
[52] U.S. Cl. .................. 701/32; 123/198 DB; 307/10.2; 701/36; 701/104; 701/113
[58] Field of Search ................................ 701/29, 31, 32, 701/33, 36, 99, 102, 103, 104, 112, 113, 114, 115; 307/10.2, 10.3, 10.4, 10.5, 10.6; 180/287; 340/425.5, 426, 428, 430; 123/198 R, 198 B, 198 DB

[56] References Cited

U.S. PATENT DOCUMENTS

| | | | |
|---|---|---|---|
| 5,561,332 | 10/1996 | Udo et al. | 307/10.5 |
| 5,638,270 | 6/1997 | Maeda et al. | 701/1 |
| 5,821,631 | 10/1998 | Loraas et al. | 307/10.4 |
| 5,838,075 | 11/1998 | Yamasaki | 307/10.3 |

*Primary Examiner*—William A. Cuchlinski, Jr.
*Assistant Examiner*—Ed Pipala
*Attorney, Agent, or Firm*—Mark L. Mollon

[57] ABSTRACT

A method of controlling engine starting of a vehicle having a powertrain control module and passive anti-theft system includes the steps of operating the engine after validation of a code by the passive anti-theft system, monitoring stopping of the vehicle engine during normal operating conditions of the powertrain control module, setting a fuel value in a software register of the powertrain control module to a non-starting value which fuel value is defaulted to in case of abnormal operation conditions of the powertrain control module, and disallowing starting of the vehicle engine during abnormal operating conditions of the powertrain control module when the fuel value contains the non-starting value.

9 Claims, 2 Drawing Sheets

METHOD OF CONTROLLING ENGINE STARTING OF VEHICLE HAVING POWERTRAIN CONTROL MODULE

BACKGROUND OF THE INVENTION

1. Field of the Invention

The present invention relates generally to a modification of powertrain control modules in vehicles which utilize passive anti-theft systems, and more specifically to a method of controlling engine starting of a vehicle having a powertrain control module to aid in theft prevention.

2. Description of the Related Art

Automotive vehicles may include passive anti-theft systems which require coding to automatically unlock the vehicle and allow starting of the vehicle. Such passive anti-theft systems have been used in conjunction with powertrain control modules (PCM). The powertrain control modules are utilized to regulate a fuel pulse width to injector drives of fuel injectors. The powertrain control module receives various sensor inputs, including communications via a data link from the passive anti-theft system.

In case of inoperability of the processor of the powertrain control module, an alternate operating strategy mode is provided which is entered during such inoperability to allow fuel to be supplied to the vehicle at a predetermined level. Such mode may be entered by inoperability of the processor of the powertrain control module, which causes the processor to be inoperative and forces the processor into the alternate operating strategy mode.

The fuel pulsewidth used to maintain vehicle driveability in the alternate operating strategy mode is sufficient enough to start the vehicle. While the vehicle is in the alternate operating strategy mode, the fuel pulsewidth used is at a fixed duration, this duration being determined during the development process. This value currently does not change once it has been calibrated to a vehicle/engine family.

SUMMARY OF THE INVENTION

Accordingly, the present invention is a method of controlling engine starting of a vehicle having a powertrain control module and passive anti-theft system. The method includes the steps of operating the engine after validation of a code by the passive anti-theft system and monitoring stopping of the vehicle engine during normal operating conditions of the powertrain control module. The method includes the steps of setting a fuel value in a software register of the powertrain control module to a non-starting value which fuel value is defaulted to in a case of abnormal operating conditions of the powertrain control module, and disallowing starting of the engine during abnormal operating conditions of the powertrain control module when the fuel value contains the nonstarting value.

The present invention is also a powertrain control module operating in conjunction with a passive anti-theft system. The powertrain control module includes a processor in communication with the passive anti-theft system, a delay circuit connected to the processor for delaying shutdown of the processor after ignition key removal and an engine monitor for monitoring starting and stopping of the vehicle engine. The powertrain control module also includes a software register for storing a fuel value. The processor operates under program control for monitoring the stopping of the vehicle engine during normal operation of the powertrain control module and to set a fuel value in the software register of the powertrain control module to a non-starting value, which fuel value is defaulted in case of abnormal operation of the powertrain control module to a non-starting value and to disallow starting of the vehicle engine during abnormal operation of the powertrain control module when the fuel value contains the non-starting value.

One advantage of the present invention is that a method is provided of controlling engine starting of a vehicle having a powertrain control module and a passive anti-theft system. Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
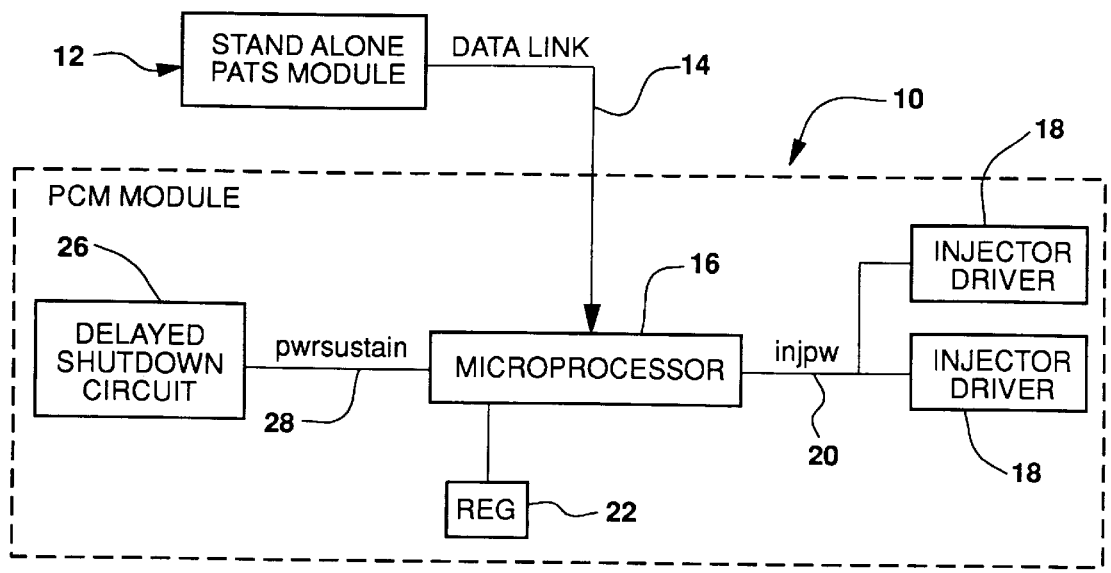
FIG. 1 is a block diagram of a powertrain control module according to the present invention.

Referring to the drawings, one embodiment of a powertrain control module 10, according to the present invention, operating in conjunction with a passive anti-theft system 12 for a vehicle (not shown) is generally shown in FIG. 1. The passive anti-theft system 12 communicates with the powertrain control module 10 via the a data link 14. The passive anti-theft system 12 communicates to the powertrain control module 10 information regarding the validation of keyless entry and key coding when a key is inserted into an ignition (not shown) of the vehicle. If the codes are verified, the passive anti-theft system 12 communicates the information to the powertrain control module 10. The powertrain control module 10 utilizes the information as long as the powertrain control module 10 is in its normal operating condition.

The powertrain control module 10 includes a processor 16 to control various operating parameters of the vehicle. The powertrain control module 10 includes injector drives 18 for driving fuel injectors (not shown) of an engine (not shown) of the vehicle. The processor 16 communicates a desired fuel pulsewidth with the injector drivers 18 by control line 20. The processor 16 of the powertrain control module 10 instructs the injector drives 18 as to the fuel pulsewidth and therefore the amount of fuel. The processor 16 includes an alternate operating strategy mode which communicates with a software fuel register 22. The software fuel register 22 is normally set with a factory calibrated fuel value, which will allow the vehicle to start and drive in abnormal conditions of the processor 16. The alternate operating strategy mode is provided by a set of coded instructions or software programming which is conventional and known in the art. The powertrain control module 10 includes a shutdown delay circuit 26 in communication with the powertrain control module 10. The shutdown delay circuit 26 is in communication with the processor 16, by a power sustain communication link 28 for a delayed shutdown of the processor 16 after normal operation of the vehicle and key removal.

The alternate operating strategy mode modifies the fuel value in the software fuel register 22. This fuel value further enhances the anti-theft capability provided by the passive anti-theft system 12 and allows the standard alternate operating strategy mode to be retained. The modified alternate operating strategy mode provides the user the capability to drive during microprocessor inoperability. During normal conditions, the register 22 is not used. The processor 16 modifies the factory calibrated fuel value with a non-starting value when the ignition is off during normal operating conditions, as subsequently discussed.

Figure 2:
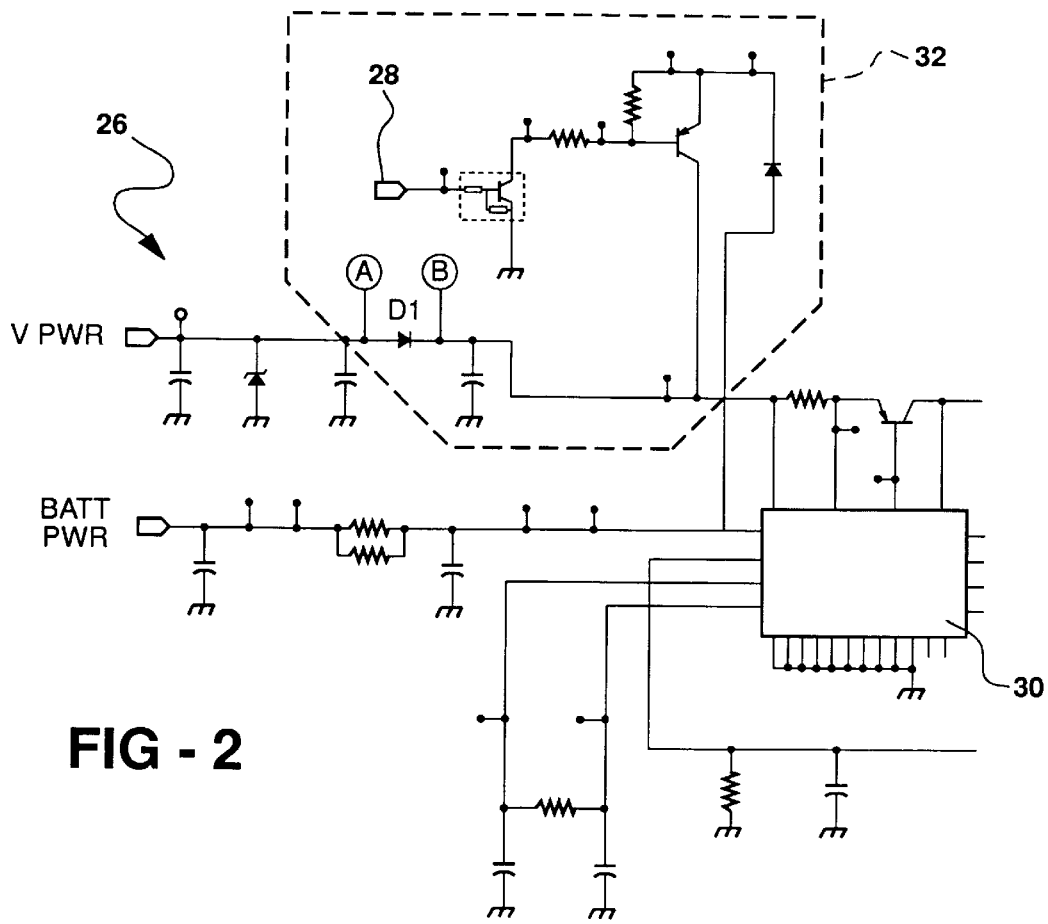
FIG. 2 is a schematic diagram of a delayed shutdown circuit of the powertrain control module of FIG. 1.

The specific circuit of the shutdown delay circuit 26 is illustrated in FIG. 2. The delay circuit 26 is common in the art, and a typical circuit is provided herein, for example. However, such delay circuit 26 has not been used in the combination set forth herein. The shutdown delay circuit 26 receives vehicle power through ignition key activation. The shutdown delay circuit 26 includes the existing power supply integrated circuit 30 for supplying regulated power to the powertrain control module 10, and a transistor delay section 32 to provide time for the processor 16 to write the non-starting value to the software fuel register 22. When this has occurred, and the vehicle is in the alternate operating strategy mode, the vehicle will be unable to start.

The powertrain control module 10 activates a power sustained link 28 after ignition on by the key. The power sustained link 28 remains active until the ignition key is removed after a delayed shutdown. The powertrain control module 10 writes a non-starting or zero fuel value into the software fuel register 22 during the delayed shutdown and then powers itself off along with disabling the link 28. No fuel will be enabled to the fuel injectors until the powertrain control module 10 receives a message from the passive anti-theft system 12 via the data link 14. When a valid message is received, the powertrain control module 10 writes a calibratable value into the software fuel register 22. This allows the user to have the alternate operation strategy enabled while driving. The shutdown delay circuit 26 is necessary to allow the powertrain control module 10 to write to the software fuel register 22 after the key is removed, and then perform an orderly shutdown.

Figure 3:
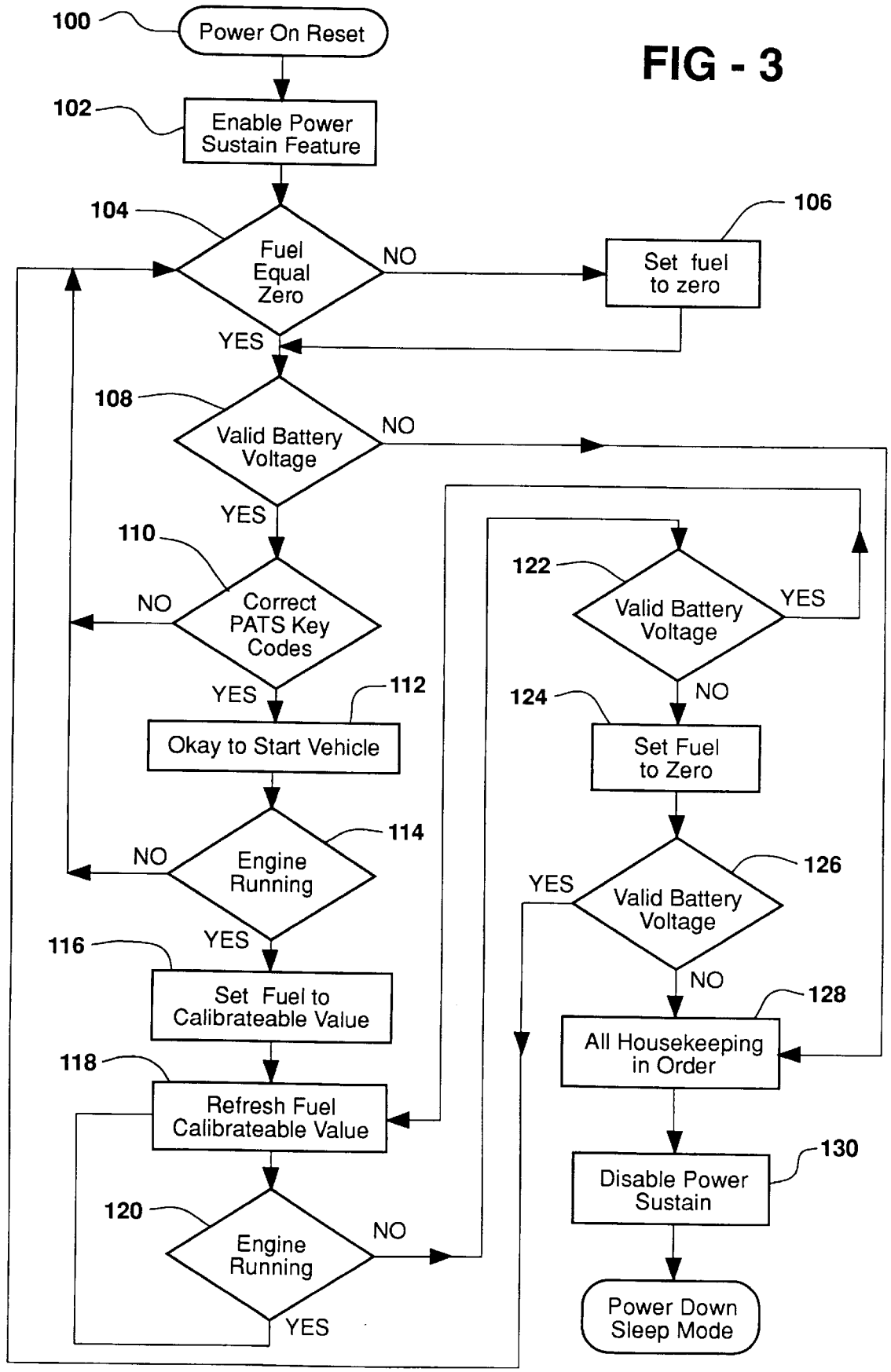
FIG. 3 is a flowchart of a method, according to the present invention, used in conjunction with the powertrain control module of FIG. 1.

Referring to FIG. 3, a method, according to the present invention, is used in conjunction with the powertrain control module 10. The method controls engine starting of the vehicle. The method starts in block 100 when power-on reset is established when the key is inserted in the ignition and turned to the on position. The method advances to block 102 and enables the power sustain link 28 to the delay shutdown circuit 26. Thereafter, the method advances to decision block 104 and check is performed to determine if the software fuel register 22 is equal to zero. This is the level within which the fuel level should be set. If not, the method advances to block 106 and the fuel level is set to the non-starting level, i.e., zero. If so or after block 106, the method advances to decision block 108 and the battery voltage is checked to determine whether or not the delay shutdown circuit is operating off battery voltage (e.g., ignition key in on position) or is in delay mode (e.g., ignition key turned to off position). This occurs by measuring the voltage on each side A and B of the diode D1 in the delay circuit 26. If the voltage is present at point A and B (valid voltage), then the module is operating off vehicle power, e.g., ignition on, and the program continues its checks. If no voltage is present at point A but is present at point B (invalid voltage), then the powertrain control module 10 is working from the delayed shutdown circuit 26 and the module 10 is controlling power to itself. When it releases the power sustain link 28, the delay circuit 26 powers down the powertrain control module 10. At this step, if there is not a valid voltage, the method advances directly to power-down. This invalid voltage may occur in case the user turns the key on and off quickly.

After validating the battery voltage in block 108, the passive anti-theft system is checked to insure the proper key code was detected in block 110. Thereafter, the vehicle may be started in block 112. Otherwise, if no correct key code was detected, the program would go back to checking the fuel value.

The module 10 checks to see that the engine is running in block 114, and if so, that the software register 22 is set to the calibrated value in block 116. The software goes through a refresh cycle during normal operation in blocks 118–120. Once the engine stops running in block 120, the battery voltage is checked to ensure key ignition off in block 122, and then the software fuel register 22 is set to zero in block 124. The battery voltage is again checked in block 126. If voltage remains invalid, house keeping is conducted in block 128, and Standard power shutdown occurs by disabling the power sustain line in block 130.

The software fuel register 22 would not be used during normal operation of the vehicle. The software fuel register 22 is only used when the processor is inoperative. If the processor is inoperative while the user is operating the vehicle. The setting of the software register 22 to the calibrated value after validation of the key code allows the vehicle to keep running or be started if inoperability in the powertrain control module 10 occurs during normal vehicle operation.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of controlling engine starting of a vehicle having a powertrain control module and passive anti-theft system, the method including the steps of:

operating the engine after validation of a code by the passive anti-theft system;

monitoring stopping of an engine of the vehicle during normal operating conditions of the powertrain control module;

setting a fuel value in a software register of the powertrain control module to a non-starting value which fuel value is defaulted to in case of abnormal operating conditions of the powertrain control module; and disallowing starting of the engine during abnormal operating conditions of the powertrain control module when the fuel value contains the non-starting value.

2. A method as set forth in claim 1 including the step of monitoring ignition key entry and validation of coding of the ignition key which disables the passive anti-theft system.

3. A method as set forth in claim 2 including the step of resetting the fuel value to the non-starting value after ignition key entry to disallowing starting of the vehicle engine, during abnormal operation of the powertrain control module.

4. A method as set forth in claim 3 including the step of monitoring engine running and resetting the fuel value to the starting value after the engine has started and is running with a valid key code.

5. A method as set forth in claim 4 including the step of delaying shutdown of the powertrain control module for a predetermined delay time after monitoring the stopping of the vehicle engine.

6. A method as set forth in claim 5 including the step of setting the fuel value to the non-starting value during the predetermined delay time.

7. A method as set forth in claim 4 including the step of retaining the starting value in the software register upon failure of the powertrain control module during engine running to allow engine starting and operating of the vehicle.

8. A method of controlling engine starting of a vehicle having a powertrain control module and passive anti-theft system, the method including the steps of:

operating the engine after validation of a code by the passive anti-theft system;

monitoring stopping of an engine of the vehicle during normal operating conditions of the powertrain control module;

delaying shutdown of the powertrain control module for a predetermined delay time after monitoring the stopping of the vehicle engine;

setting a fuel value in a software register of the powertrain control module to a non-starting value during delayed shutdown which fuel value is defaulted to in case of abnormal operating conditions of the powertrain control module; and disallowing starting of the engine during abnormal operating conditions of the powertrain control module when the fuel value contains the non-starting value.

9. A powertrain control module operating in conjunction with a passive anti-theft system, said module comprising:

a processor in communication with the passive anti-theft system;

a delay circuit connected to the processor for delayed shutdown of the processor after ignition key removal;

an engine monitor for monitoring starting and stopping of the vehicle engine;

a software register for storing a fuel value;

the processor operating under program control for monitoring the stopping of the vehicle engine during normal operation of the powertrain control module and setting the fuel value in a software register of the powertrain control module to a non-starting value which fuel value is defaulted in case of abnormal operation of the powertrain control module to a non-starting value, and disallowing starting of the vehicle engine during abnormal operation of the powertrain control module when the fuel value contains the non-starting value.

* * * * *